US006456034B1

(12) United States Patent
Vilou

(10) Patent No.: US 6,456,034 B1
(45) Date of Patent: Sep. 24, 2002

(54) DEVICE FOR CONTROLLING THE POWER SUPPLY OF AN ELECTRIC STARTER MOTOR OF A MOTOR VEHICLE AND A STARTER UNIT CONTAINING SUCH A DEVICE

(75) Inventor: Gérard Vilou, Tassin (FR)

(73) Assignee: Valeo Equipments Electriques Moteur, Creteil (FR)

( * ) Notice: Subject to any disclaimer, the term of this patent is extended or adjusted under 35 U.S.C. 154(b) by 0 days.

(21) Appl. No.: 09/395,148

(22) Filed: Sep. 14, 1999

(30) Foreign Application Priority Data

Sep. 16, 1998 (FR) ........................................ 98 11550

(51) Int. Cl.$^{7}$ ........................................ H02P 5/28

(52) U.S. Cl. ..................... 318/811; 318/599; 318/286; 361/29; 361/28; 123/146.5 D; 123/179.3; 123/179.5; 324/422; 324/420; 324/424

(58) Field of Search ............ 361/28, 29; 123/146.5 D, 123/179.3, 179.5; 324/420, 422, 424; 318/599, 286, 811

(56) References Cited

U.S. PATENT DOCUMENTS 2,020,750 A * 11/1935 Wertz ........................ 290/37
3,681,658 A * 8/1972 Naoi et al. ............... 317/13 R
3,857,043 A * 12/1974 Habasch ..................... 290/38
4,481,786 A * 11/1984 Bashark ..................... 318/438
4,687,982 A * 8/1987 Palaniappan ............... 318/763
4,851,751 A * 7/1989 Gipson ....................... 318/599
5,041,771 A * 8/1991 Min ........................... 318/786
5,350,992 A * 9/1994 Colter ........................ 318/807
5,831,804 A * 11/1998 Vilou ......................... 361/28
6,104,157 A * 8/2000 Kramer et al. ............ 318/445

FOREIGN PATENT DOCUMENTS

FR 2 147 379 3/1973

OTHER PUBLICATIONS

The Columbia Electronic Encyclopedia, Columbia University Press, 1994, 2000. pp.1–2.*

Patent Abstracts of Japan vol. 005, No. 172 (M–095), Oct. 31, 1981 & JP 56 098567 A (Mitsubishi Electric Corp), Aug. 8, 1981.

* cited by examiner

*Primary Examiner*—Marlon T. Fletcher
*Assistant Examiner*—Rina I. Duda
(74) *Attorney, Agent, or Firm*—Morgan & Finnegan, LLP

(57) ABSTRACT

In a device for controlling the power supply of the electric motor of a starter of a motor vehicle, and of an automobile in particular, a power switch is connected in series with the electric motor to control the motor power. The switch consists of an electronic power unit capable of being controlled.

11 Claims, 1 Drawing Sheet

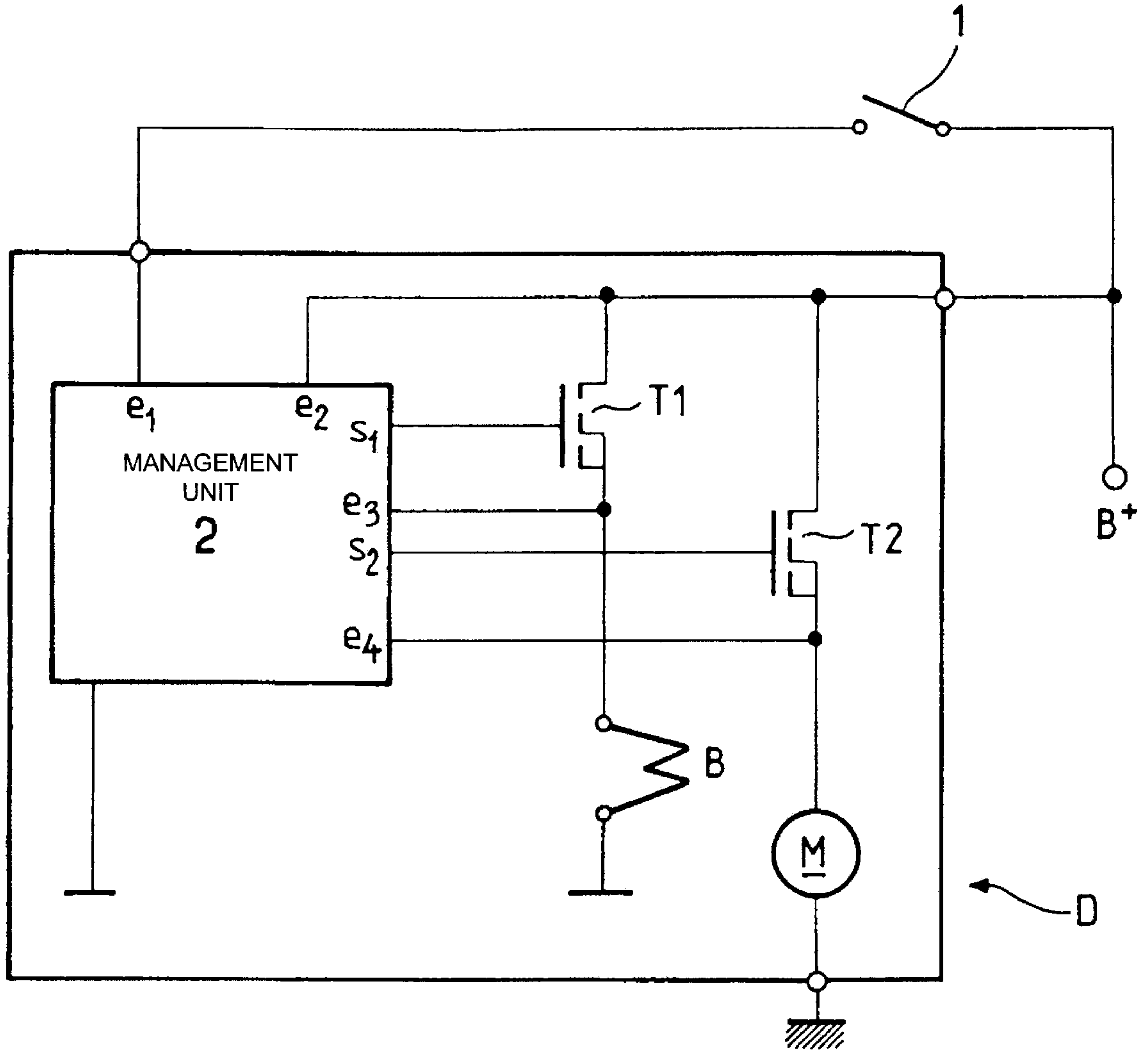
1
e1
e2
s1
MANAGEMENT
UNIT
2
e3
s2
e4
T1
T2
B+
B
M
D

DEVICE FOR CONTROLLING THE POWER SUPPLY OF AN ELECTRIC STARTER MOTOR OF A MOTOR VEHICLE AND A STARTER UNIT CONTAINING SUCH A DEVICE

FIELD OF THE INVENTION

The invention relates to a device for controlling the power supply of an electric starter motor of a motor vehicle, and of an automobile in particular.

BACKGROUND OF THE INVENTION

Traditionally, the power supply for an electric starter motor is controlled by an electromechanical power contact (coil relay) which is actuated as a function of the status of the vehicle circuit breaker, either directly or by way of an electronic management device, integrated or not integrated in the starter.

In any event, the power contacts of automobile starters may be the cause of excessive voltage drop at the terminals of the electric starter motor. There may be various reasons for such a voltage drop, including contact corrosion, oxidation caused by arcing, short-circuit caused by deposits of copper dust engendered by the arcing, chatter when the contact closes, premature closing of the contacts even before the pinion has engaged sufficiently in the starter crown wheel, etc.

One of the objects of the invention is to address these problems.

SUMMARY OF THE INVENTION

According to a first aspect of the present invention there is provided a device for controlling the power supply of the electric starter motor of the vehicle, and of an automobile in particular, comprising a power switch connected in series with said electric motor to control the power supply to said motor, wherein the power switch comprises a controllable electronic power component.

Advantageous features include the following, considered alone or according to all their technically possible combinations:

- The electronic component is a power transistor;
- The electronic component is controlled by a management unit;
- The movement of the starter pinion is controlled by an electro-magnet, the coil of which is connected in series with a second electronic component the power of which can be controlled, which is itself controlled by the management unit and which controls the power supply of said coil.
- The second electronic power component is a power transistor.
- The second power component is controlled by a cyclic pulse-width-modulated signal.
- The management unit receives the voltage at the input at the terminals of the coil, and comprises means to detect the stabilisation of this voltage, as well as means for modifying the cyclic ratio of said pulse-width-modulated signal when this stabilisation is detected.
- The management unit comprises means to control the transition to the passing state of the power component, which controls the power feed to the electric motor when this voltage stabilisation is detected.
- The power transistors may be of the MOSFET type.

According to a second aspect of the invention there is provided a starter unit for a motor vehicle, and for an automobile in particular, comprising an electric motor, a pinion intended to be started by said motor, media to move said pinion from a position of rest to a position in which it engages with a crown wheel of the internal combustion engine, and a device to control the power supply of its electric motor, wherein the device is in accordance with the first aspect.

BRIEF DESCRIPTION OF THE DRAWINGS

Other characteristics and advantages of the invention can be derived from the description which follows. It should be read in conjunction with the single FIGURE appended, which is a schematic representation of a device conforming to a possible embodiment of the invention.

DESCRIPTION OF THE PREFERRED EMBODIMENT

Referring to the FIGURE, a motor M of a starter D is connected with a circuit-breaker T2 between a ground and a terminal B+of the voltage feed from the vehicle battery.

The circuit-breaker T2 does not consist of an electromechanical contact but a power transistor which is actuated by a management unit 2.

This management unit 2 is, for example, a micro-controller of which one input e1 is connected to the voltage terminal B+by way of the vehicle circuit-breaker (key-actuated circuit-breaker or other type, indicated by reference 1 in the FIGURE), and of which an output s2 controls the circuit-breaker T2. The micro-controller 2 is, in addition, also connected directly to the terminal B+by a power supply input e2.

The power transistor T2 is, for example, a transistor of the MOSFET type, of which the gate is subjected to a voltage generated by said micro-controller 2 at the level of its aforesaid output s2.

The management unit which comprises this micro-controller 2 likewise controls the power supply of a coil B of an electro-magnet, which in turn controls the movement of the pinion of the starter.

To this end, the coil B is connected between the ground and the terminal B+of the voltage supply from the battery, with a power transistor T1 controlled by the management unit 2.

The transistor T1 is, for example, a MOSFET transistor, of which the gate is subjected to a voltage generated by the management unit 2 at one of its outputs (indicated by the reference FIG. 1 in the FIGURE).

This management unit 2 likewise receives, at its two inputs e3, e4, on the one hand the voltage at a point between the coil B and the circuit-breaker T1, and, on the other, the voltage at a point between the motor M and the transistor T2.

The power supply sequence for the coil B and the motor M is as follows:

The closing of the circuit-breaker 1 puts the micro-controller 2 into a state of activation.

This initiates several different initialization operations, such as verification that the armature of the motor M is not in rotation (absence of induced voltage at the terminals of the motor M), that the coil B is not being supplied with power, or such as a check on the temperature of the starter.

Once these operations have been carried out, the micro-controller 2 controls the transistor T1 in such a way that the coil B is supplied by a pulse width modulated (PWM) current. To this end, the PWM modulation may itself be generated by the micro-controller 2 on the command voltage of the gate of the transistor T1. Other arrangements are possible (in particular, the PWM modulation of the supply current of the coil B could be generated by a specific assembly arranged in the supply circuit of said coil B).

The control which is thus exercised on the transistor T1 allows for the engagement at reduced speed of the starter pinion with the crown wheel of the combustion engine.

The voltage which is received at the input e3 allows for the development of the voltage to be monitored at the terminals of the coil B. As the movable core of the electro-magnet controlled by the coil B moves, so the voltage at the terminals of said coil varies. It only stabilises when the core has travelled its course.

Once this stabilisation is detected by the micro-controller 2, the voltage at the output s2 passes into the high state, and unblocks the power transistor T2 which supplies the electric motor M.

At the same time, the cyclic ratio of the PWM voltage controlling the transistor T1 changes in value in such a way that the supply current of the coil B passes to a sustained value.

This value is chosen to be sufficiently high to keep the electro-magnet closed, but likewise sufficiently low as not to incur excessive heating of the coil B or the transistor T1.

As a variant, the transistor T1 can be fed in accordance with a predetermined voltage law as a function of time. At the end of a predetermined time period, the output 2 passes into the high state and unblocks the power transistor T2.

At the end of the unblocking process, i.e. when the contact key is released, or when the micro-controller 2 issues the automatic ending of the starting process, the micro-controller 2 causes the voltages at the outputs s1 and s2 to switch to low state, in order to block the transistors T1 and T2.

Control of the power in this way for an electric starter motor presents numerous advantages.

It brings about static switching, avoiding all the known phenomena such as contact oxidation, wear, corrosion, contact chatter, etc.

It also allows for costs, dimensions, and weights to be reduced, the contactor no longer having any force to be exerted when the power contacts close.

What is claimed is:

1. A device for controlling power supplied to a starter of a motor vehicle, comprising:

a power switch including a controllable electronic power component;

an electric motor connected in series to the power switch for starting a combustion engine of the motor vehicle upon receiving power from the power switch; and a management unit for controlling the electronic power component of the power switch, the management unit operative to:

perform initialization operations prior to activating the power switch, said initialization operations comprising at least one of: a verification that an armature of the electric motor is not in rotation, a coil operatively connected to the electric motor is not being supplied with power and a check of a temperature of the motor; and activate the power switch after completion of the initialization operations, whereby power is supplied to the electric motor only upon completion of the initialization operations.

2. The device of claim 1, wherein the electronic power component is a first power transistor.

3. The device of claim 1, wherein the management unit comprises a micro-controller.

4. The device of claim 3, further comprising:

an electro-magnet having a coil for actuating the combustion engine upon receipt of power to the coil;

a second controllable electronic power component connected in series with the coil for supplying power to the coil upon activation, and further connected to the management unit, wherein the management unit is operative to activate the second controllable electronic power component upon completion of the at least one initialization operation.

5. The device of claim 4, wherein the second electronic power component is a second power transistor.

6. The device of claim 4, wherein the coil is controlled by a cyclic pulse-width-modulated signal.

7. The device of claim 6, wherein the management unit is further operative to receive a voltage at an input terminal of the coil, detect a stabilization of the voltage and modify a cycle of said pulse-width-modulated signal when the stabilization is detected.

8. The device of claim 7, wherein the management unit is further operative to activate the electronic power component that controls the power supply to the electric motor when the stabilisation of the voltage from the input terminal of the coil is detected.

9. The device of claim 2, wherein the first power transistor is of the MOSFET type.

10. The device of claim 5, wherein the second power transistor is of the MOSFET type.

11. A starter for a combustion engine of a motor vehicle, comprising:

electric motor for starting the combustion engine; and a device to selectively power the electric motor, the device including a power switch connected in series with said electric motor in order to control power thereto, wherein the power switch commprises a controllable electronic power component which is controlled by a management unit operative to perform operations prior to actuating the controllable eletronic power component, said initialization operations comprising at least one of: a verification that an armature of the electric motor is not in rotation, a coil operatively connected to the electric motor is not being supplied with power and a check of a temperature of the motor.

* * * * *